United States Patent Office
3,705,888
Patented Dec. 12, 1972

3,705,888
NON-IONIC, NICKEL n-ALKYLAMINE
ARYLAZOARYL COMPOUNDS
Charles Edward Lewis, 404 William St.,
Somerville, N.J. 08876
No Drawing. Filed Dec. 29, 1969, Ser. No. 888,920
Int. Cl. C09b 45/22; D06p 3/00, 1/10
U.S. Cl. 260—151        4 Claims

ABSTRACT OF THE DISCLOSURE

Non-ionic, heavy metal (Ni′II) amine arylazoaryl compounds of the formula:

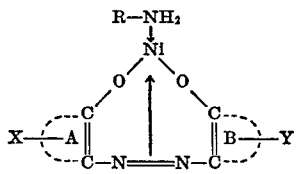

wherein R is an n-alkyl of from 4 to 18 carbon atoms, A and B are each aryl and X and Y, individually, are H, OH, Cl, Br, $NO_2$, CN, $SO_2$-alkyl of from 1 to about 4 carbons or alkoxy of from 1 to about 4 carbons, useful in dyeing either nylon or polypropylene fibers, are provided as well as a method for dyeing therewith. A preferred compound for dyeing nylon is the nickel-n-butylamine complex of 1-(2-hydroxyphenylazo)-2-naphthol. A preferred compound for dyeing polypropylene is the nickel-n-decylamine complex of 1-(5-chloro-2-hydroxyphenylazo)-2-naphthol. The dyeings provided by the compounds on nylon and polypropylene are of high tinctorial strength, good light-fastness and uniform shade.

---

The present invention relates to heavy metal azo compounds capable of dyeing nylon and polypropylene fibers and a method of dyeing such materials. More particularly, it is concerned with non-ionic nickel amine complexes of o,o′-dihydroxy monoazo compounds which provide dyeings of exceptional strength and fastness on these materials.

In the past, difficulties have been encountered in attempting to dye nylon or polypropylene fibers. For instance, in the production of nylon fibers, the nylon is subjected to extrusion thus creating tension in the filament. Such tension creates imperfections in the structure of the fiber. Due to these imperfections, a phenomenon known as the barré effect occurs, i.e., a streaked appearance of the dyed fiber that occurs when nylon fabric with imperfections is dyed. On the other hand, in the case of polypropylene, the dyes which have been used heretofore fail to provide sufficient tinctorial strength and lightfastness.

The metallized o,o′-dihydroxy monoazo dyes used heretofore for wool and nylon possess properties which render them insufficient for the purposes herein stated due to the ionic nature of the dyes and the presence therein of a coordinately linked molecule of water with the metal, which reduces their tinctorial strength, as evidenced by their lower extinction coefficient and lightfastness.

Accordingly, it is an object of this invention to provide heavy metal-complex azo dyes which overcome the aforesaid deficiencies of the prior art dyes.

This object is accomplished by the present invention which provides a new class of heavy metal-complex azo dyes which when dyes on nylon or polypropylene provide dyeings of high tinctorial strength, good light-fastness and uniform shades and which when dyed on nylon provide freedom from the "barré" effect. The new dyes of the invention are non-ionic, n-alkylamine nickel o,o′-dihydroxy monoazo compounds of the formula:

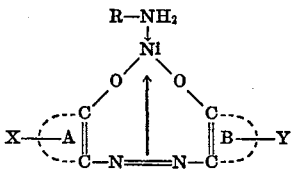

where R is an n-alkyl of from 4 to 18 carbons; A and B are each aryl and X and Y, individually, are H, OH, Cl, Br, $NO_2$, CN, $SO_2$-alkyl of from 1 to about 4 carbons or alkoxy from 1 to about 4 carbons.

The compounds of the present invention are superior to those of the prior art. Thus, they have greater affinity for nylon and polypropylene than corresponding chromium amine complexes and greater stability than corresponding copper amine complexes.

Compounds of the present invention most suitable for use on nylon are those where R ranges from about 4 to about 8 carbon atoms. Those most suitable for dyeing polypropylene are those in which R ranges from 7 to about 18 carbons, and preferably from 9 to 12 carbon atoms.

The compounds of the present invention must be free of acid groups such as carboxylic and sulfonic and their corresponding primary amide or salt groups since the presence of such groups significantly decreases the affinity of the compounds for both nylon and polypropylene.

Illustrative of suitable diazo components are:

2-aminophenol,
2-amino-4,5, or 6-chlorophenol,
2-amino-4,5, or 6-nitrophenol,
2-amino-4-phenylphenol,
2-amino-6-chloro-4-nitrophenol,
2-amino-4 or 5-methylphenol, and
2-amino-4,6-dinitrophenol Exemplary of suitable coupling components are:

Phenols 4-methylphenol,
2,4-dimethylphenol,
2-nitro-1,3-dihydroxybenzene,
1,3-dihydroxybenzene, Naphthols 2-naphthol,
2,7-dihydroxynaphthalene,
2,6-dihydroxynaphthalene,
4-bromo-1-naphthol,
4-chloro-1-naphthol,
4-cyano-2-naphthol,
4-methoxy-1-naphthol,
8-methylsulfonyl-2-naphthol, and
8-acetamido-2-naphthol The compounds of the present invention may be made by a straightforward process. For instance, the corresponding o,o′-dihydroxy monoazo dye is prepared by coupling a diazotized o-hydroxyaryl amine or a diazotized o-methoxy or o-chloro arylamine to a wide variety of commercially available aromatic compounds, having a hydroxy group in ortho position to the site of coupling. The various azo compounds are dissolved in a polar solvent such as alcohol, Carbitol, 2-ethoxyethanol, dimethylformamide, dimethylsulfoxide and tetrahydrofuran and then metallized by addition of Nickel II salts, such as nickel acetate tetrahydrate or nickel sulfate hexahydrate, at a temperature of 60° C. to reflux or higher, until metallization is complete. The result is a metal complex having one molecule of water coordinately linked with the metal. The chelated dye is collected and dissolved in any one of the polar solvents enumerated above and then admixed with a normal alkylamine in excess of the stoichiometric amount, that is, more than one mole of amine per mole of dye or per azo group. In practice, the replacing of water bound to nickel by the amine is carried out at a temperature ranging from about 60° C. to reflux. The solution is filtered to remove any remaining unreacted starting materials and water is then added to precipitate the final product.

The alkylamines contemplated herein are normal alkylamines of at least four carbons and no more than eighteen carbons. Typical of such are n-butylamine, n-pentylamine, n-hexylamine, n-heptylamine, n-octylamine, n-nonylamine, n-decylamine, n-hendecylamine, n-dodecylamine, n-tridecylamine, n-tetradecylamine, n-pentadecylamine, n-hexadecylamine, n-heptadecylamine and n-octadecylamine and mixtures of the same. The use of isomers such as branch-chained or secondary amines is found to result in a lowering of tinctorial strength.

For dyeing, the compounds of the present invention are dispersed in an aqueous dyebath by means of anionic surfactant, such as sodium lauryl sulfate or sodium alkylaryl sulfonate. The pH of the bath is adjusted to from 6 to 10.8, preferably between 7 and 10.5. The nylon or polypropylene fibers are immersed in the bath and dyed for about one hour at a temperature of 65° C.–100° C., preferably 93° C.–100° C. It is noted that a pH below 6 will result in a reduction of light-fastness as well as less uniform shade and distribution.

The nickel amine complex dyes of the invention are outstanding disperse dyes for nylons in general and polypropylene fibers which have been modified with polymeric vinyl pyridines or certain vinyl pyridine acrylamide copolymers as defined in U.S. Pat. 3,315,014. Such fibers find wide use in indoor and outdoor carpet yarn.

A full understanding of the present invention will be had from the following examples in which all parts are by weight unless otherwise indicated.

EXAMPLE 1

A nickel-n-butylamine complex having the formula

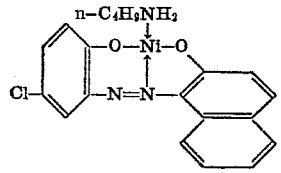

is prepared as follows: One part of a compound prepared by coupling diazotized 2-amino-4-chlorophenol to 2-naphthol is dissolved in 100 parts (by volume) of hot Carbitol. A solution of 0.8 part nickel acetate tetrahydrate in 50 parts (by volume) of hot Carbitol is added and the mixture is heated for 3 hours at 110° C. After cooling to room temperature, the nickel complex is isolated by filtration. The complex is then slurried in 100 parts (by volume) of ethanol at the boil and a molar excess of n-butylamine is added to effect solution. The n-butylamine-nickel complex precipitates on cooling. It is isolated and recrystallized from ethanol. On analysis the following is found:

Actual (percent): C, 56.35; H, 5.01; N, 9.18; Ni, 14.45.
Theory (percent): C, 56.2; H, 4.7; N, 9.8; Ni, 13.7.

EXAMPLE 2

Dyeing on nylon of the complex of Example 1

0.25 part of the nickel-butylamine dye complex of Example 1 is dissolved in 3 parts (by volume) of acetone and 1 part (by volume) of 5% aqueous solution of an anionic surfactant, lauryl sodium sulfate, added. The resultant dye is then added to 200 parts (by volume) of water. A 5 part wet-out skein of undyed trilobal continuous filament nylon is introduced and the dye bath heated to 96° C. The dyeing is carried out at 96° C. for one hour. The dyed nylon filament is removed, rinsed with water and dried. It is dyed a uniform, strong blue-red hue.

The dyed nylon has excellent fastness to light, rating 6–7 and excellent fastness to sublimation, gas fading and dry-cleaning, rating 5 for all and 4–5 for cotton wash when tested by standard AATCC procedures. These procedures and ratings are presented in the current edition of the AATCC Technical Manual published for the American Association of Textile Chemists and Colorists by Howes Publishing Company, New York, N.Y., Section 2, Colorfastness.

EXAMPLE 3

A nickel n-butylamine complex of the formula

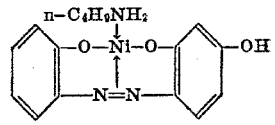

is prepared as follows: 7.0 parts of water-nickel complex of the azo dye, diazotized o-aminophenol coupled to resorcinol, is slurried in 100 parts (by volume) of alcohol at the boil. 15 parts (by volume) of n-butylamine is added to effect solution of the dye. After refluxing one hour, 300 parts (by volume) of ice water is added. The whole is cooled to room temperature. A dilute acetic acid solution is added to neutralize and precipitate the butylamine complex. When the complex is applied to nylon filament, an orange shade is produced with excellent fastness properties.

EXAMPLE 4

A nickel n-butylamine of the formula

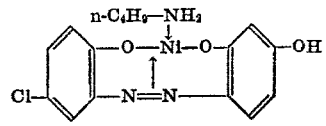

is prepared by using 2-amino-4-chlorophenol in place of 2-aminophenol in Example 3 above. It dyes nylon filament a deep burnt-orange shade with excellent fastness properties.

EXAMPLE 5

A nickel n-butylamine complex of the formula

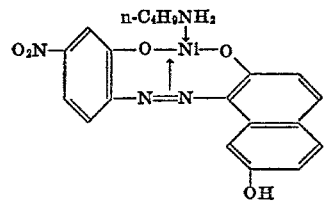

is prepared as follows: 3.3 parts of the azo dye, diazotized 5-nitro-2-aminophenol coupled into 2,7-dihydroxynaphthalene, is slurried in 300 parts (by volume) of ethanol. A solution of 2.6 parts nickel acetate tetrahydrate in 50 parts (by volume) of ethanol is added and the mixture refluxed two hours. After cooling, the nickel complex is filtered off, washed and dried at 70° C. The dried product is slurried in 250 parts (by volume) ethanol with 10 parts (by volume) of n-butylamine and refluxed two hours. After cooling, the dye is filtered off, washed and dried. It dyes nylon a heavy blue-red shade with excellent fastness to light, sublimation and gas fading and shows no barré effect.

By using o-aminophenol in place of 5-nitro-2-aminophenol, the dye obtained produces a yellow-red shade on nylon filament with equal fastness properties.

If 2-amino-4-chlorophenol is used in place of the 5-nitro-2-aminophenol, the resulting compound dyes nylon filament a strong violet shade with excellent fastness.

EXAMPLE 6

Ni-n-octylamine complex of the dye 1-(5-chloro-2-hydroxyphenylazo)-2-naphthol 3.0 parts of the azo dye, diazotized 2-amino-4-chlorophenol coupled to 2-naphthol, are dissolved in 150 parts (by volume) of Carbitol at 110° C. A solution of 2.5 parts nickel acetate tetrahydrate in 50 parts (by volume) of hot Carbitol is then added. A precipitate forms immediately. It is digested in one hour, cooled to 70° C. and sufficient water is added to complete precipitation. Is is isolated by filtration.

The wet presscake is then surried in 150 parts (by volume) of Carbitol and heated to 80° C.; 5 parts (by volume) of n-octylamine are added and stirred at 80° C. until solution is complete. Water is then added to cause precipitation. The octylamine complex is isolated by filtration and crystallized from 350 parts (by volume) of 85% alcohol.

When dyed on nylon filament by the method of Example 2 a very strong blue-red hue is produced.

EXAMPLE 7

Employing the respective methods of Examples 1 and 2, the following tabularized dyes are prepared and dyed on nylon to give dyes of good color value as set forth in Table I below.

TABLE I

| | | Applied to nylon | | | |
|---|---|---|---|---|---|
| | | | Fastness rating | | |
| Complex contains one atom nickel, one mole of n-butylamine with one mole of dye prepared by coupling diazotized— | Hue | Light | Sublimation | Gas fading | Dry cleaning |
| 2-amino-4-nitrophenol to 2-naphthol | Violet | 6-7 | 5 | 5 | 5 |
| 2-amino-6-chloro-4-nitrophenol to 2-naphthol | Brown-red | 6-7 | 5 | 5 | 5 |
| 2-amino-4-chlorophenol to 2,7-dihydroxynaphthalene | Blue-red | 6-7 | 5 | 5 | 5 |
| 2-aminophenol to 2,7-dihydroxynaphthalene | Scarlet | 6-7 | 5 | 5 | 5 |
| 2-amino-5-nitrophenyl to 2,7-dihydroxynaphthalene | Violet | 6-7 | 5 | 4-5 | 5 |

EXAMPLE 8

Color strength comparison of nickel complexes (A) Preparation of the corresponding nickel-water complex of 1 - (5 - chloro-2-hydroxyphenylazo)-2-naphthol.—5.97 parts of the azo dye 2-amino-4-chlorophenol coupled to 2-naphthol is slurried in 700 parts (by volume) of hot alcohol. A solution of 4.98 parts nickel acetate tetrahydrate in 70 parts (by volume) of hot alcohol is added and the mixture is refluxed three hours. On cooling the water-nickel complex is isolated by filtration, washed with water and dried. Yield is 6.1 parts. It is purified from a mixture of dimethylformamide and water. The dye complex has an extinction coefficient of 11,900. On analysis: Found: 15.86% Ni. Theory: 15.72% Ni.

(B) Preparation of the Ni-pyridine complex from A.—3.73 parts of the above complex "A" is slurried in ethanol at the boil. 10 parts (by volume) of pyridine is added and the resultant solution is boiled for 2½ hours. It is cooled and the pyridine complex is isolated by filtration.

(C) Preparation of the nickel-ethylene diamine complex from A.—3.7 parts of the water-nickel complex is slurried in 30 parts (by volume) of ethanol at the boil and 5.0 parts (by volume) of ethylene diamine is added. The mixture is refluxed two hours by which time it is completely in solution. The dye is isolated by adding sufficient water, after cooling, to cause precipitation. The complex is filtered off, washed and dried at 70° C. It is recrystallized from a dimethylformamide-alcohol solution.

The compounds of Examples 8A, 8B, and 8C were compared with the compound of Example 1 by dyeing nylon with each of the dyes in a dyebath as described in Example 2 above and observing strength of shade. The results are tabulated below:

TABLE II

| | | Applied to nylon | |
|---|---|---|---|
| Example | Nickel complex | Shade or hue | Strength of color, percent |
| 1 | n-Butylamine | Blue-red | 100 |
| 8A | Water | Pink | 10 |
| 8B | Pyridine | Blue-red | 60 |
| 8C | Ethylenediamine | Pale pink | 5 |

EXAMPLE 9

Effect on strength of dyed polypropylene of increasing carbons of n-alkylamines (A) Preparation of nickel-water complex starting material.—A solution of 3.6 parts of 2-amino-4-chlorophenol in a mixture of 63 parts (by volume) of water and 17.5 parts (by volume) of 20% hydrochloric acid is diazotized with 25 parts (by volume) of normal sodium nitrite solution at 10° C. and clarified by filtration. The solution is added to a solution of 3.8 parts of 2-naphthol dissolved in 125 parts (by volume) of water mixed with 25 parts (by volume) of 20% sodium hydroxide solution. When coupling is complete, the mixture is acidified with hydrochloric acid, filtered and the resultant product washed with water.

The wet cake of unmetallized compound prepared above is dissolved in 250 parts (by volume) of hot 2-(2-ethoxyethoxy) ethanol and clarified. To the solution maintained at 110–120° C. is added 7.5 parts of nickel acetate tetrahydrate dissolved in 50 parts (by volume) of equal parts of water and Carbitol. The whole is digested at 110–120° C. for one hour, cooled, filtered and the product sucked as dry as possible. The product, which is the monohydrated nickel chelate of 1-(5-chloro-2-hydroxy-phenylazo)-2-naphthol containing one atom of nickel per mole of compound, is next employed as a reactant.

(B) Preparation of the series of nickel-amine complexes:

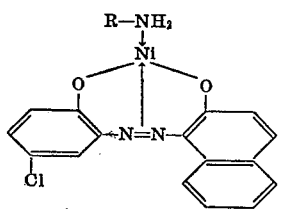

The press cake (0.025 mole) prepared as in A above is slurried in 200 parts (by volume) of 2-(2-ethoxyethoxy)-ethanol containing an excess of any of the amines listed below. The amine, R–NH$_2$ (see Table III), is in excess of 0.025 mole and is 10 parts (by volume) of liquid amine or 10 parts of solid amine. The whole is heated gradually with stirring until a solution is obtained. Temperatures between 60° C. and 120° C. effect solution. When metallization is complete, the solution is clarified. Water is added gradually until precipitation of the nickel-amine complex product starts. The whole is allowed to stand and is cooled to room temperature to complete precipitation. The product is filtered, washed with methanol and dried.

The products are dyed on polypropylene yarn by the procedure of Example 11.

Visible spectrum reflectance curves are run on the dyed skeins and a measurement of color strength obtained. This strength is recorded in the Table III below, using the n-butyl-amine nickel complex as standard at 100% for comparison. Note the peak of color strength with ten carbon atoms, i.e., the nickel-n-decylamine complex.

Also, the extinction coefficient was determined for the Ni-n-octylamine complex to be 18,340. The corresponding water complex has a lower extinction coefficient of 11,900. This is a measure of the tinctorial strength of the dye molecule per se.

TABLE III

| R | Dyed polypropylene | |
|---|---|---|
| | Strength, percent | Color |
| n-C$_4$H$_9$NH$_2$ | 100 | Blue-red. |
| n-C$_6$H$_{13}$NH$_2$ | 170 | Do. |
| n-C$_7$H$_{15}$NH$_2$ | 210 | Do. |
| n-C$_8$H$_{17}$NH$_2$ | 285 | Do. |
| n-C$_9$H$_{19}$NH$_2$ | 370 | Do. |
| n-C$_{10}$H$_{21}$NH$_2$ | 465 | Do. |
| n-C$_{12}$H$_{25}$NH$_2$ | 410 | Do. |
| n-C$_{18}$H$_{37}$NH$_2$ | 245 | Do. |

EXAMPLE 10

This example illustrates another azo combination where "R" contains eight and twelve carbon atom amines.

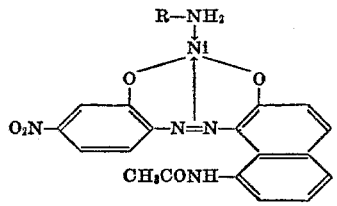

A solution of 15.4 parts of 2-amino-5-nitrophenol in a mixture of 250 parts (by volume) of water and 70 parts (by volume) of 20% hydrochloric acid solution at 80° C. is iced to 5° C. and diazotized with 7.0 parts of sodium nitrite dissolved in 50 parts (by volume) of water. This is added to a solution of 21 parts of 8-acetamido-2-naphthol in 1000 parts (by volume) of water containing 40 parts (by volume) of 20% sodium hydroxide solution and 12 parts of 20% sodium bicarbonate. When coupling is complete the dye is filtered, reslurried in one liter of water and acidified with dilute hydrochloric acid solution. The azo dye is filtered and washed with water until free from acid. The wet cake is slurried in 1500 parts (by volume) of 2-(2-ethoxyethoxy)-ethanol at 120° C., most being dissolved. A solution of 30 parts of nickel acetate tetrahydrate in 200 parts (by volume) of water is added. When metallization is complete, 800 parts (by volume) of water is added to separate the nickel hydrate dye complex. It is filtered and divided in half.

Each half of the wet cake of product prepared above is treated separately by dissolving each in 300 parts (by volume) of 2-(2-ethoxyethoxy)ethanol at 80° C. and 10 parts (by volume) of the amine added. In one instance, (I) n-octylamine is added to one half and in the other, (II) n-dodecylamine is added to the second half. After digesting one hour on a steam bath, each is cooled. Each product is washed with methanol and dried at 80° C.

When each of the products I and II is dyed by the method of Example 11, a blue-grey hue is obtained. Compound II has greater tinctorial strength than Compound I. Lightfastness of the dyed yarn is good.

EXAMPLE 11

Method of dyeing polypropylene 0.20 part of the compound is dissolved in 5 parts (by volume) of acetone. The solution is added to 50 parts (by volume) of water in which is dissolved 1 part (by volume) of a 5% solution of sodium lauryl sulfate. The whole is made up to a volume of 250 parts (by volume) with water. (The pH is determined and adjusted to within pH 7 to 10.5 if need be with alkali hydroxide (NaOH) or mineral acid (HCl).) To this dyebath is added a 5 part skein of polypropylene carpet yarn. The dyebath is heated to 100° C. and boiled one hour. The skein is removed, rinsed in hot water and scoured. The dyed yarn is scoured for ten minutes in 250 parts (by volume) of water containing 1% soda ash and 1% of a nonionic agent, nonylphenoxy-poly(ethyleneoxy)ethanol, on the weight of the yarn, rinsed and dried.

I claim:

1. A non-ionic, heavy metal, amine arylazo compound of the formula:

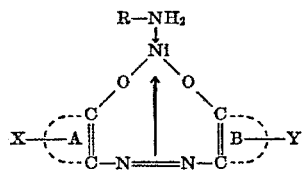

where R is n-alkyl of from 9 to 12 carbon atoms, A is phenylene, B is phenylene or naphthalene and X and Y are individually selected from the group consisting of H, OH, Cl, Br, NO$_2$, CN, SO$_2$-alkyl of from 1 to 4 carbon atoms and alkoxy of from 1 to 4 carbon atoms.

2. The compound:

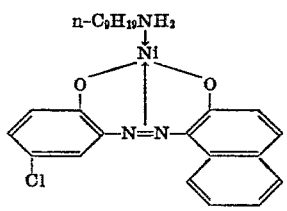

3. The compound:

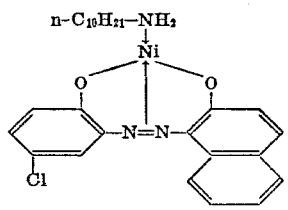

4. The compound:

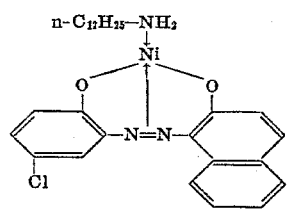

(References on following page)

References Cited

UNITED STATES PATENTS

| | | | |
|---|---|---|---|
| 1,895,559 | 1/1933 | Straub et al. | 260—151 |
| 1,994,116 | 3/1935 | Straub et al. | 260—151 X |
| 2,694,056 | 11/1954 | Ludwig et al. | 260—197 |
| 2,814,614 | 11/1957 | Zickendraht | 260—145 |
| 2,215,105 | 9/1940 | Krizikalla et al. | 260—151 |
| 2,315,870 | 4/1943 | Nadler et al. | 260—151 |
| 2,628,960 | 2/1953 | Freyermuth | 260—151 |
| 3,051,696 | 8/1962 | Dettwyler | 260—146 X |
| 3,356,671 | 12/1967 | Johnson et al. | 260—145 |
| 3,538,073 | 11/1970 | Mack et al. | 260—146 |

OTHER REFERENCES

Zollinger, "Azo and Diazo Chemistry Aliphatic and Aromatic Compounds," pp. 355 and 356 (1961).

FLOYD D. HIGEL, Primary Examiner

U.S. Cl. X.R.

8—4, 42 B; 260—41 C, 146 R, 149, 197, 199

UNITED STATES PATENT OFFICE
CERTIFICATE OF CORRECTION

Patent No. 3,705,888           Dated December 12, 1972

Inventor(s) Charles Edward Lewis

It is certified that error appears in the above-identified patent and that said Letters Patent are hereby corrected as shown below:

First column, line 5, after the inventor's address, insert -- assignor to American Cyanamid Company, Stamford, Conn. --.
Column 1, line 1 of the Abstract of the Disclosure: (Ni'II) should read -- (Ni II) --.

Signed and sealed this 17th day of April 1973.

(SEAL)
Attest:

EDWARD M. FLETCHER, JR.            ROBERT GOTTSCHALK
Attesting Officer                  Commissioner of Patents